Feb. 21, 1961 W. A. THORNTON, JR 2,972,694
METHOD OF OPERATING ELECTROLUMINESCENT CELL
Filed Aug. 12, 1959

INVENTOR
WILLIAM A. THORNTON, Jr.
BY
W. D. Palmer
ATTORNEY

United States Patent Office 2,972,694
Patented Feb. 21, 1961

2,972,694

METHOD OF OPERATING ELECTROLUMINESCENT CELL

William A. Thornton, Jr., Cranford, N.J., assignor to Westinghouse Electric Corporation, East Pittsburgh, Pa., a corporation of Pennsylvania Filed Aug. 12, 1959, Ser. No. 833,265

6 Claims. (Cl. 313—108)

This invention relates to electroluminescent cells and, more particularly, to a method for operating an electroluminescent cell whereby its effective life is increased.

The phenomenon of electroluminescence was first disclosed by G. Destriau, one of his earlier publications appearing in London, Edinburgh and Dublin Philosophical Magazine, series 7, volume 38, No. 285, pages 700–737 (October 1947). A more recent comprehensive summary of electroluminescence can be found in Destriau and Ivey article titled "Electroluminescence and Related Topics," "Proceedings of the I.R.E.," volume 43, No. 12, pages 1911–1940 (December 1955). Since the first disclosure of the phenomenon of electroluminescence by G. Destriau, such cells have been marketed commercially. As is the case with other types of light sources, the brightness level of the electroluminescent devices decreases with operation. When the brightness has decreased to that level where the cell is no longer considered usable, the effective life of the cell is considered exhausted. It would be desirable to increase the effective life of electroluminescent cells.

It is the general object of this invention to provide a method for operating an electroluminescent cell in order to increase its effective life.

It is a further object to provide particular operating conditions for an electroluminescent cell in order to increase its effective life.

The aforesaid objects of the invention, and other objects which will become apparent as the description proceeds, are achieved by first operating an electroluminescent cell with predetermined electrical excitation having low voltage and high frequency. After the cell has been operated under such conditions for a sufficient time to cause the light output to deteriorate to a predetermined value, the cell is operated with a predetermined electrical excitation having a high voltage and low frequency. With such a mode of operation, the effective life of an electroluminescent cell is increased.

For a better understanding of the invention, reference should be had to the accompanying drawings wherein.

Figure 1:
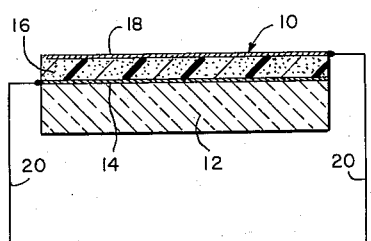
Fig. 1 is a cross-sectional view of a conventional electroluminescent cell with a variable-frequency and variable-voltage excitation source, shown in diagrammatic form, connected across the cell electrodes.

The present method for increasing the effective life of an electroluminescent cell is applicable to any construction of electroluminescent cell. With specific reference to the cells illustrated in the drawings, in Fig. 1 is shown in cross section an electroluminescent cell 10 which generally comprises a glass foundation member 12 having coated thereover a thin, light-transmitting, electrically-conducting layer 14 such as tin oxide, which serves as a first electrode. Coated over the first electrode layer 14 is a layer 16 comprising mixed electroluminescent phosphor and dielectric material. Coated over the phosphor-dielectric layer 16 is a second electrode 18 which as an example is a thin layer of vacuum-metallized aluminum or silver. Such an electroluminescent cell construction is conventional and additional layers of dielectric material per se can also be included between the cell electrodes if desired. Alternatively, a separate layer of dielectric and phosphor in either powdered or thin film form can be sandwiched between the cell electrodes or a thin layer of powdered or thin-film electroluminescent phosphor per se can be sandwiched between the cell electrodes. Any electroluminescent phosphor can be used in the cell 10 and as an example, the phosphor is a green-emitting electroluminescent phosphor comprising zinc sulfide activated by copper and coactivated by chlorine. Such a phosphor is prepared by mixing 1,000 grams of zinc sulfide with 30 grams of sulphur, 12.8 grams copper acetate and 4.5 grams ammonium chloride. This mixture is fired in a partially-closed container in a nitrogen atmosphere at a temperature of about 950° C. for about 100 minutes. Thereafter, the phosphor is slightly crushed, 3 grams of sulphur are added to the crushed phosphor and it is refired in a similar manner. After final firing, the phosphor is lightly crushed and desirably washed in a cuprous sulfide solvent such as a one-normal solution of sodium cyanide. The washed phosphor is dried and incorporated into dielectric material to form the layer 16. The dielectric material can be any suitable light-transmitting dielectric in the case the phosphor is mixed therewith and an example is polyvinyl-chloride acetate. The weight ratio of mixed phosphor and dielectric is not critical and as an example they are mixed with one another in equal proportions by weight. The layer 16 has a thickness of two mils and this can be varied. The cell 10 is adapted to be energized through lead conductors 20 which connect the cell electrodes 14 and 18 to an electrical energizing source 22 which is variable both in frequency and voltage.

Figure 2:
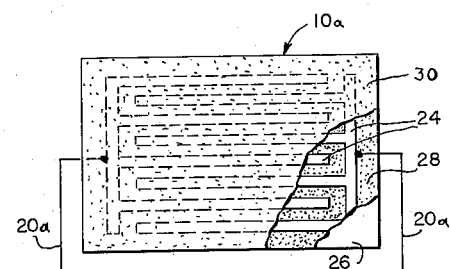
Fig. 2 is a plan view, partly broken away, of an electroluminescent cell incorporating grid-mesh type electrodes with the variable-frequency and variable-voltage excitation source which energizes the cell shown in diagrammatic form.
Figure 3:
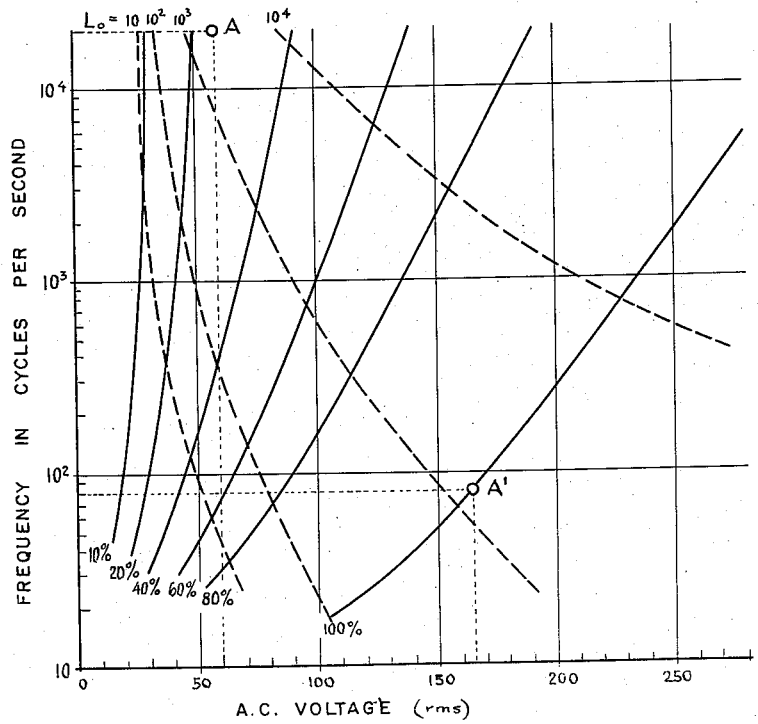
Fig. 3 illustrates a series of curves of operating frequency versus operating A.C. voltage, showing performance characteristics for a particular electroluminescent cell operated in accordance with the present method.

In the cell embodiment 10a as shown in Fig. 2, the cell electrodes 24 are formed as a grid mesh, such as disclosed in Fig. 3 of U.S. Patent No. 2,684,450, dated July 20, 1950. These cell electrodes can be formed by vacuum-metallizing conducting strips such as copper, for example, onto a plastic foundation 26 and the layer 28 of phosphor or phosphor mixed with dielectric, as the case may be, is placed over the cell electrodes 24. The phosphor or phosphor-dielectric layer 28 can comprise any electroluminescent phosphor as in the cell embodiment 10. The cell 10a is adapted to be energized through lead conductors 20a which connect the cell electrodes 24 to an electrical energizing source 22a which is variable both in frequency and voltage. A light-transmitting plastic layer 30 desirably is used to cover the phosphor-dielectric layer 28. As seen from the foregoing constructions, the electroluminescent cell can take various forms. Both of the foregoing cell embodiments 10 and 10a essentially comprise spaced electrodes having electroluminescent phosphor included therebetween.

The operating characteristic curves as shown in Fig. 3 were taken for an electroluminescent cell constructed in accordance with the cell embodiment 10 as shown in Fig. 1. The ordinate values for the curves of Fig. 3 express the frequency in cycles per second of the electrical energization for the cell. The broken lines in Fig. 3 represent what can be termed curves of equal initial brightness. Relative arbitrary brightness values ($L_0$) for each of these curves are indicated directly on Fig. 3. The solid lines in Fig. 3 represent values of percent maintenance of light output which are obtained when operating the cell under predetermined conditions for a predetermined time. By way of further explanation, the cell 10 as shown in Fig. 1 was first energized with an electrical energization having a magnitude of 60 volts R.M.S. (average field of 30 volts per mil) and a frequency of 20 kcs., indicated by the point "A" on Fig. 3. The initial brightness ($L_0$) for the cell operated under these conditions was slightly greater than $10^3$ arbitrary brightness units, as indicated by the value shown on the closest broken equal-brightness line in Fig. 3. For this specific cell, when operated under conditions of room temperature and 40% relative humidity, the brightness dropped to approximately 20% of the initial brightness after thirty hours of operation. Thereafter the cell was operated with an electrical energization having a potential magnitude of approximately 165 volts (average field of 82 volts per mil) and a frequency of alternation of approximately 80 cycles (point A' on Fig. 3). The initial brightness ($L_0$) of the previously-deteriorated cell, when operated under these latter-indicated conditions, was approximately equivalent to that brightness first realized when the cell was operated with the 60 volt-20 kcs. electrical energization. Thereafter the cell was operated under the latter-indicated high voltage and low frequency conditions until its brightness again decreased so that it was 20% of the initial brightness of approximately $10^3$ units. In the foregoing example, the cell initial brightness ($L_0$) when excited by high voltage-low frequency is the same irrespective of whether the cell has previously been deteriorated or exhausted by operation with the indicated excitation of 60 volts, 20 kcs.

The "life" of an electroluminescent cell is conveniently measured by establishing an arbitrary percentage of initial light output and operating the cell until this percentage value of initial light output has been realized. At this point, the "life" of the electroluminescent cell can be regarded as exhausted. Such an arbitrary method for determining the life of an electroluminescent cell is necessary where failure resulting in an open circuit, such as in the case of an incandescent lamp, is rarely experienced. As is illustrated in the performance curves shown in Fig. 3, by first energizing the cell with an electrical energization having a predetermined potential which is relatively small and a predetermined frequency which is relatively high, and operating the cell under such conditions for a predetermined period until the light output has dropped to a predetermined value, the cell can thereafter be energized with an electrical energization having relatively high voltage and relatively low frequency of alternation, as compared to that of the first energization, in order to obtain what amounts to two "lifetimes" from the cell.

Realization of the apparent two "lifetimes" for an electroluminescent cell can only be obtained when the initial cell electrical energization has relatively low voltage and high frequency and the latter or second-applied electrical energization has relatively high voltage and low frequency. This observation can be explained on the basis that under low voltage excitation, very localized high field regions are developed within the phosphor crystal, which high fields produce the electroluminescent light emission. It also appears that the higher frequencies of excitation result in a localization of the "active" portions of the crystal which are effective in producing light. Thus the combination of low voltage and high frequency for the first or initial energization of the cell exhausts only relatively discrete portions of the phosphor crystals and only these energized, "active" discrete portions will deteriorate with respect to electroluminescent light emission. Thereafter, when the cell is energized to electroluminescence with relatively high voltage and low frequency, more extensive regions of the crystals are excited to electroluminescence so that what might be termed the "active" or light-producing regions of the phosphor crystals include fresh portions which have not been deteriorated by the initial operation. The energization of these "fresh" crystal portions effectively masks any reduced light emission from previously-deteriorated portions of the phosphor crystals, since apparently these deteriorated portions are limited to very localized, discrete regions of the crystals. Thus when the cell is initially deteriorated to a predetermined value of light output by operating same with an electrical energization having a high voltage and low frequency (contrary to the present teachings), and thereafter operated a second time with an energization having a relatively high frequency and low voltage, the cell is not revitalized with respect to light output. In other words, in the foregoing example, the two "lifetimes" or increase in effective life can only be obtained when the initial electrical energization has a low voltage and high frequency and the second or latter electrical energization has a high voltage and a low frequency.

As a general rule the effective life of an electroluminescent cell, when measured as a percentage of initial light output as indicated hereinbefore, is proportional to the total number of cycles of electrical energization used to excite the cell. Cells which are operated in accordance with the present method follow this same general pattern with respect to decay of light output. It should be pointed out, however, that where the cell is first operated with low voltage and high frequency in accordance with the present invention, this has no measurable effect on the life of the same cell when later operated under energization by substantially higher voltage and substantially lower frequency. In other words, the life of the cell under excitation by high voltage and low frequency is the same irrespective of whether the cell has previously been operated under excitation by low voltage and high frequency, and its initial brightness under excitation conditions of high voltage and low frequency is the same as if the cell had not first been deteriorated by operation with a low voltage and high frequency excitation.

For the specific cell embodiment 10 as shown in Fig. 1, the breakdown potential of the cell, that is the potential where arcing is apt to occur across or between the electrodes, is approximately 300 volts. The potential of the first or initial electrical energization of the cell is necessarily of substantially smaller magnitude than that potential required to cause cell electrical breakdown since the potential of the latter electrical energization is necessarily of substantially greater magnitude than that of the initial energization. Of course when cells are operated in accordance with the present method in order to increase their effective life, the potential magnitudes of any electrical energizations for the cell should be below that potential which could cause an electrical breakdown across or between the cell electrodes.

Many different electroluminescent cells have been operated in accordance with the present invention. If the initial electrical energization has a low potential and high frequency and the latter or second energization has a relatively high potential and relatively low frequency, an increase in effective life for the cells is always obtained. The specific conditions of operation for the cells in accordance with the present invention are subject to an infinite number of variations. For example, the cell embodiment 10 as shown in Fig. 1 could be energized with the potential and frequency as indicated in the foregoing example until the cell light output decreased to only 60% of its initial value. Thereafter, the cell could be operated with a greater potential and lower frequency to increase its effective life. A family of curves similar to those shown in Fig. 3 could be plotted for such operation, but would be different from those which are shown in Fig. 3. In other words, for each condition of electrical energization, a complete family or set of curves can be plotted. The operating conditions for the cells will also vary with respect to the ambient conditions under which the cells are operated since these will effect the maintenance of light output and thus the relationships of the family of curves which can be plotted. By way of further explanation, under conditions of high humidity, the maintenance of light output of the electroluminescent cells will normally not be as good as that realized under conditions of low humidity. This of course will affect the family of curves which can be plotted to illustrate the operating characteristics for the cell under specific conditions of energization. The family of curves which can be plotted for each set of operating conditions will also be affected by the phosphor which is selected as well as the dielectric, since different electroluminescent phosphors and different dielectric materials will cause the cells to display varying, so-called maintenance of light output characteristics.

It is not necessary to operate the cells to obtain the same initial light outputs ($L_0$) at the beginning of the first energization and at the beginning of the second energization. As an example, in the family of curves as shown in Fig. 3, the cell was initially energized with 60 volts-20 kcs. to obtain an initial light output slightly greater than $10^3$ arbitrary units. The cell was operated under these indicated conditions until its light output had decreased to approximately 20% of the initial light output. The cell could thereafter be operated with a voltage of 230 and a frequency of approximately 800 cycles in order to obtain an initial light output of $10^4$ arbitrary light units. The cell could be operated under these latter conditions until its light output had again decreased to a predetermined value. Alternatively, the second or latter electrical energization could be so selected that the initial light output was slightly greater than was $10^2$ arbitrary light units, such as by operating the cell after initial deterioration with a voltage of 120 and a frequency of approximately 20 cycles. In either of the foregoing cases, the cell under the latter excitation by high voltage and low frequency essentially behaves as though it had not previously been deteriorated under excitation by low voltage and high frequency. It should be understood that the greater the amount a cell is deteriorated under initial excitation by low voltage and high frequency, the greater the differential required between the respective voltages and frequencies of the first and second excitations to cause the cell to behave as though it were completely "fresh" when operated after the initial deterioration.

As shown hereinbefore, some increase in effective life will be realized whenever the latter electrical energization has a predetermined potential which is substantially greater than that of the initial electrical energization and a predetermined frequency of alternation which is substantially less than the frequency of alternation of the initial energization. It has been found that in order to increase substantially the effective life of the cell, the second electrical energization should have a potential of at least about 50% greater magnitude than the potential of the initial energization and the frequency of alternation of the second-applied energization should be less than about $\frac{1}{10}$ the frequency of alternation of the initially-applied electrical energization although any increase in operating voltage or decrease in operating frequency will lead to some improvement.

The present invention is equally applicable to so-called ceramic-type cells wherein the phosphor is embedded in glass dielectric since the effective life of a cell can be increased by operation in accordance with the present method, whatever the dielectric or cell fabrication or construction details.

It will be recognized that the objects of the invention have been achieved by providing a method for operating an electroluminescent cell in order to increase its effective life. In addition, there have been provided particular operating conditions for increasing the effective life of an electroluminescent cell.

While best embodiments of the invention have been illustrated and described in detail, it is to be particularly understood that the invention is not limited thereto or thereby.

I claim:

1. The method of increasing the effective life of an electroluminescent cell comprising spaced electrodes having electroluminescent phosphor included therebetween, which method comprises, energizing said cell to electroluminescent light output for a predetermined period by applying across said spaced electrodes a predetermined first alternating electrical potential having smaller magnitude than that potential required to cause cell electrical breakdown and also having a high frequency of alternation, and thereafter energizing said cell to electroluminescent light output for an additional predetermined period by applying across said spaced electrodes a predetermined second alternating electrical potential having a greater magnitude than that of the previously-applied potential but less than that potential required to cause cell electrical breakdown and also having a frequency of alternation less than the frequency of alternation of the previously-applied potential.

2. The method of increasing the effective life of an electroluminescent cell comprising spaced electrodes having electroluminescent phosphor included therebetween, which method comprises, energizing said cell to electroluminescent light output for a predetermined period by applying across said spaced electrodes a predetermined first alternating electrical potential having considerably smaller magnitude than that potential required to cause cell electrical breakdown and also having a relatively-high frequency of alternation, and thereafter energizing said cell to electroluminescent light output for an additional predetermined period by applying across said spaced electrodes a second predetermined alternating electrical potential having a magnitude at least about 50% greater than that of the previously-applied potential but less than that potential required to cause cell electrical breakdown and also having a frequency of alternation less than about one-tenth the frequency of alternation of the previously-applied potential.

3. The method of increasing the effective life of an electroluminescent cell comprising spaced electrodes having electroluminescent phosphor included therebetween, which method comprises, energizing said cell to obtain a predetermined initial electroluminescent light output by applying across said spaced electrodes a first electrical energization having a predetermined potential of substantially smaller magnitude than that potential required to cause cell electrical breakdown and also having a predetermined high frequency of alternation, operating said cell with such first electrical energization for a predetermined period until the light output from said cell has decreased to a predetermined value, thereafter energizing said cell to a predetermined electroluminescent light output by applying across said spaced electrodes a second electrical energization having a predetermined potential of substantially greater magnitude than that of the previously-applied potential but less than that potential required to cause cell electrical breakdown and also having a predetermined frequency of alternation substantially less than the frequency of alternation of the previously-applied potential, and operating said cell with such second electrical energization for a predetermined time until the light output from said cell has decreased to a predetermined value.

4. The method of increasing the effective life of an electroluminescent cell comprising spaced electrodes having electroluminescent phosphor included therebetween, which method comprises, energizing said cell to obtain a predetermined initial electroluminescent light output by applying across said spaced electrodes a first electrical energization having a predetermined potential of considerably smaller magnitude than that potential required to cause cell electrical breakdown and also having a predetermined relatively high frequency of alternation, operating said cell with such first electrical energization for a predetermined period until the light output from said cell has decreased to a predetermined value, thereafter energizing said cell to a predetermined electroluminescent light output by applying across said spaced electrodes a second electrical energization having a predetermined potential of at least 50% greater magnitude than that of the previously-applied potential but less than that potential required to cause cell electrical breakdown and also having a predetermined frequency of alternation less than about one-tenth the frequency of alternation of the previously-applied potential, and operating said cell with such second electrical energization for a predetermined time until the light output from said cell has decreased to a predetermined value.

5. The method of increasing the effective life of an electroluminescent cell comprising spaced electrodes having electroluminescent phosphor included therebetween, which method comprises, energizing said cell to obtain a predetermined initial electroluminescent light output by applying across said spaced electrodes a first electrical energization having a predetermined potential of substantially smaller magnitude than that potential required to cause cell electrical breakdown and also having a predetermined high frequency of alternation, operating said cell with such first electrical energization for a predetermined period until the light output from said cell has decreased to a predetermined value, thereafter energizing said cell to a predetermined electroluminescent light output approximately equal to the light output initially obtained by applying across said spaced electrodes a second electrical energization having a predetermined potential of substantially greater magnitude than that of the previously-applied potential but less than that potential required to cause cell electrical breakdown and also having a predetermined frequency of alternation substantially less than the frequency of alternation of the previously-applied potential, and operating said cell with such second electrical energization for a predetermined time until the light output from said cell has decreased to a predetermined value.

6. The method of increasing the effective life of an electroluminescent cell comprising spaced electrodes having electroluminescent phosphor included therebetween, which method comprises, energizing said cell to obtain a predetermined initial electroluminescent light output by applying across said spaced electrodes a first electrical energization having a predetermined potential of considerably smaller magnitude than that potential required to cause cell electrical breakdown and also having a predetermined high frequency of about 20 kcs., operating said cell with such first electrical energization for a predetermined period until the light output from said cell has decreased to a predetermined value, thereafter energizing said cell to a predetermined electroluminescent light output by applying across said spaced electrodes a second electrical energization having a predetermined potential about 275% greater than that of the previously-applied potential but less than that potential required to cause cell electrical breakdown and also having a predetermined frequency of alternation of about 30 cycles, and operating said cell with such second electrical energization for a predetermined time until the light output from said cell has decreased to a predetermined value.

References Cited in the file of this patent

UNITED STATES PATENTS

| | | |
|---|---|---|
| 2,698,915 | Piper | Jan. 4, 1955 |
| 2,755,406 | Burns | July 17, 1956 |
| 2,901,652 | Fridrich | Aug. 25, 1959 |
| 2,921,218 | Larach | Jan. 12, 1960 |